April 5, 1966 D. W. ELLIOTT 3,244,292
UNIVERSAL CABLE, WIRE, AND LOAD-HANDLING DEVICE
Filed Feb. 9, 1965 5 Sheets-Sheet 1
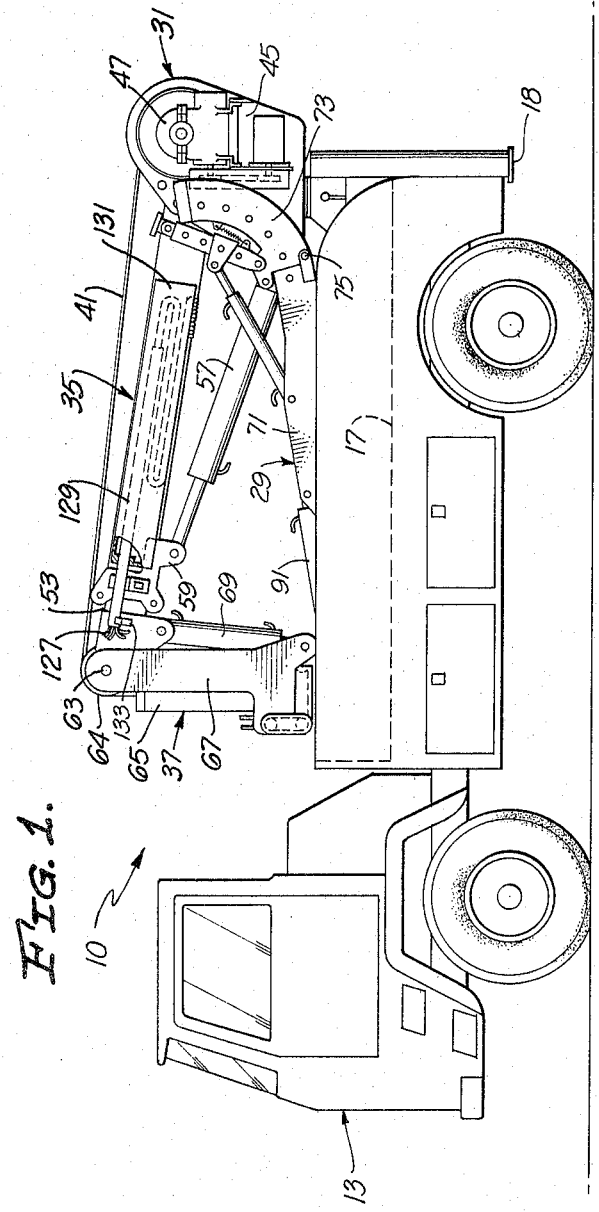
INVENTOR.
DARIUS W. ELLIOTT
BY HIS ATTORNEYS
HARRIS, KIECH, RUSSELL & KERN April 5, 1966 D. W. ELLIOTT 3,244,292
UNIVERSAL CABLE, WIRE, AND LOAD-HANDLING DEVICE
Filed Feb. 9, 1965 5 Sheets-Sheet 2
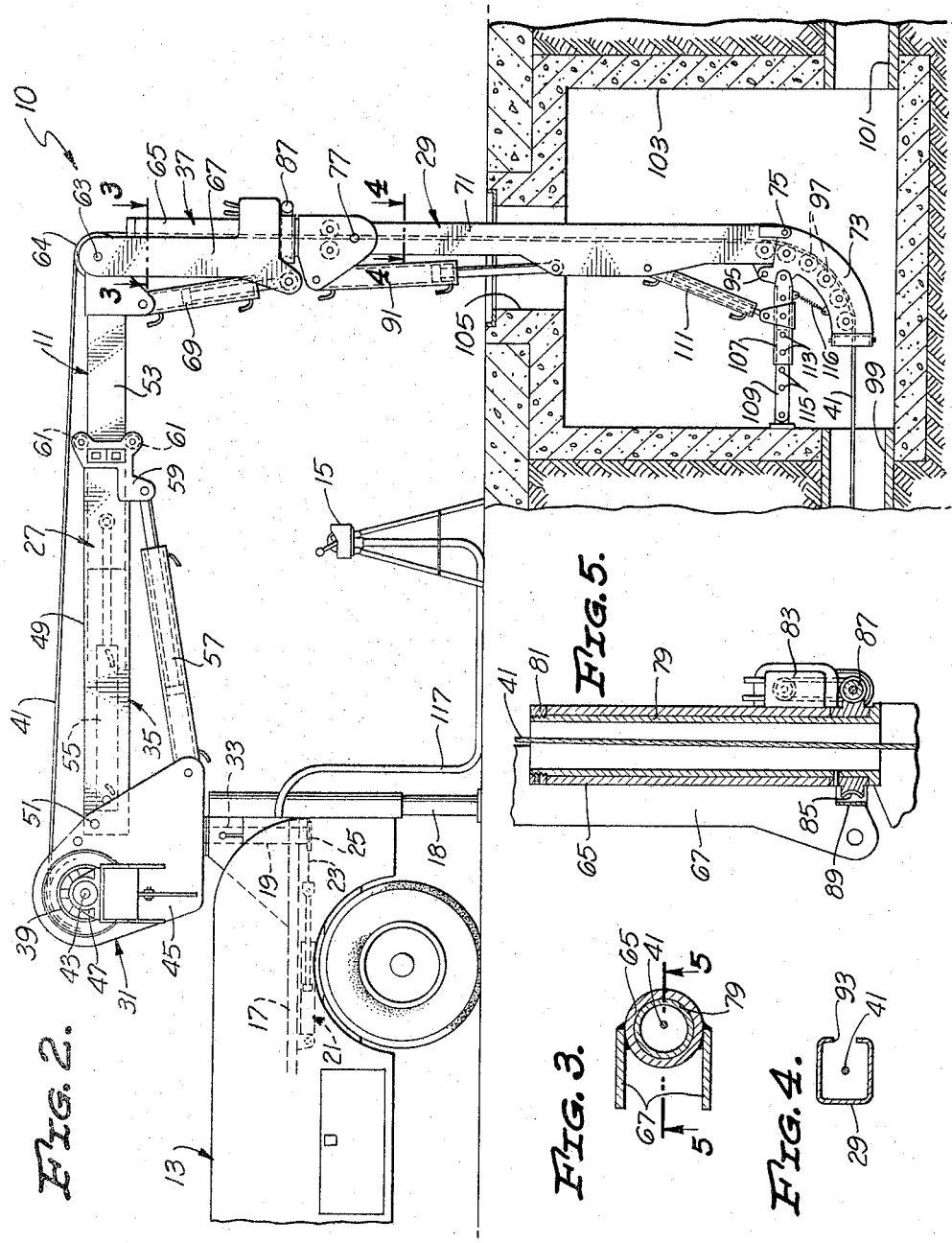
INVENTOR.
DARIUS W. ELLIOTT
BY HIS ATTORNEYS
HARRIS, KIECH, RUSSELL & KERN

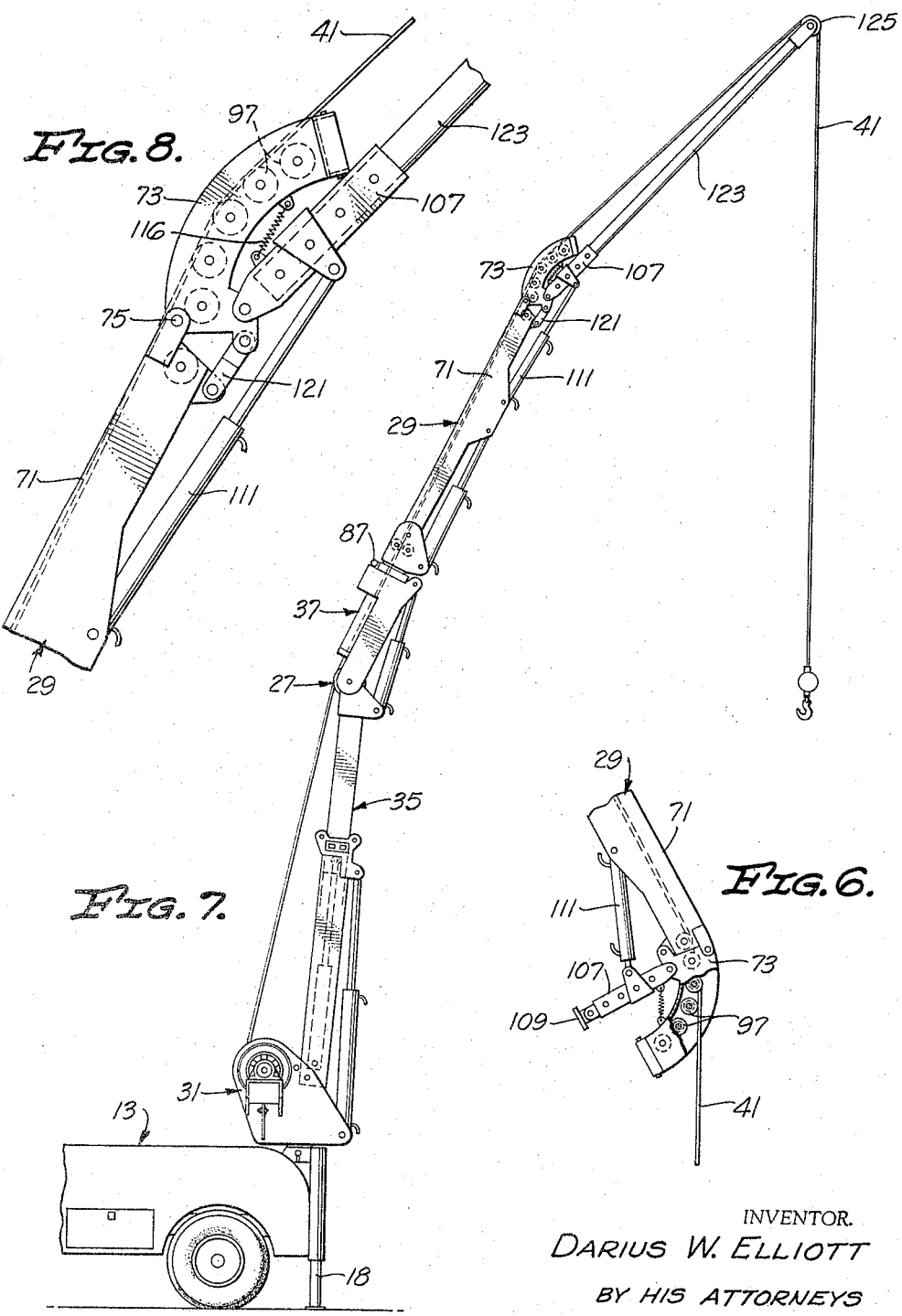

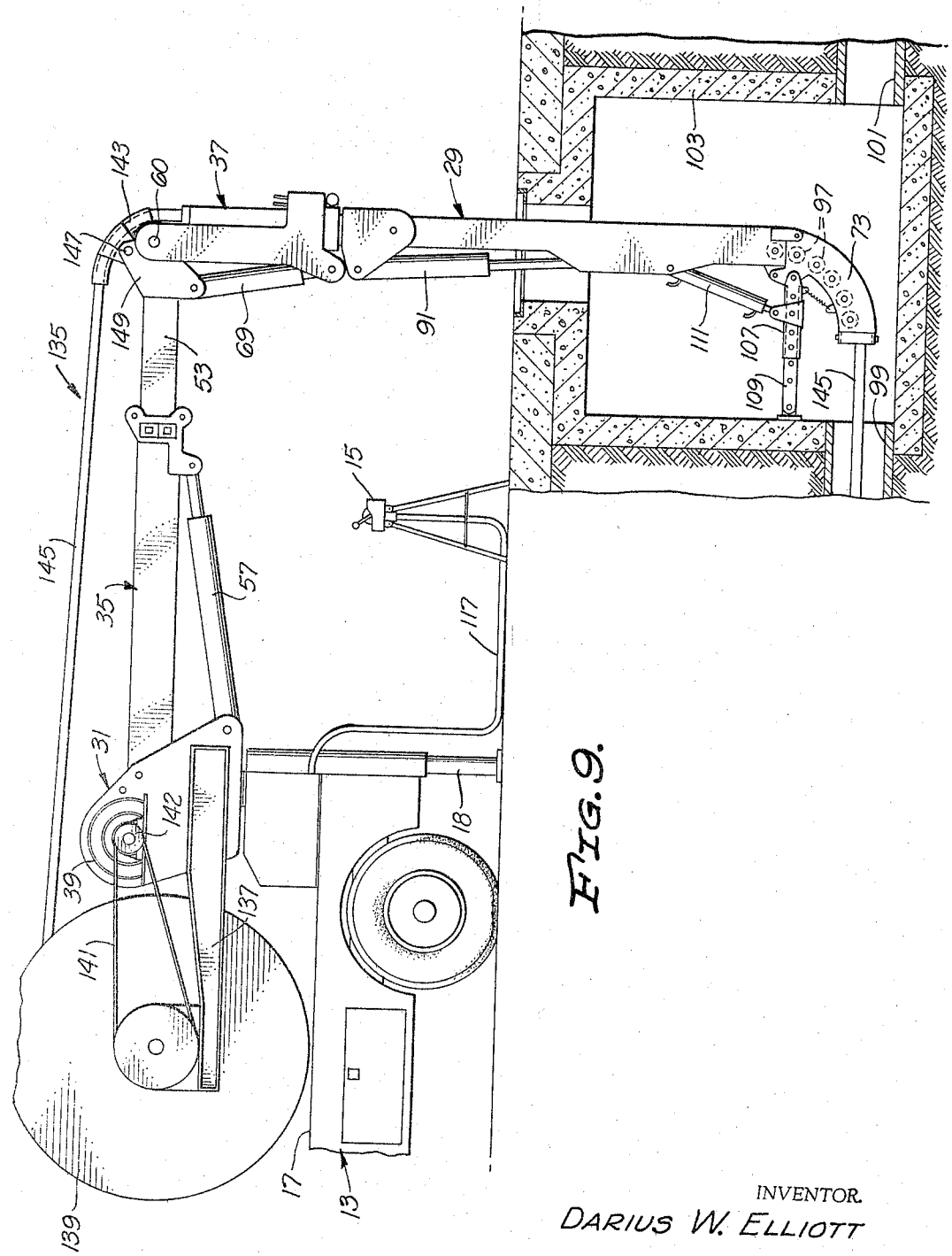

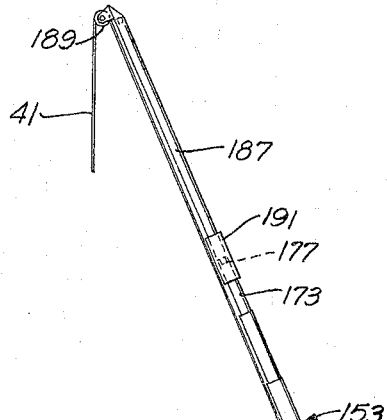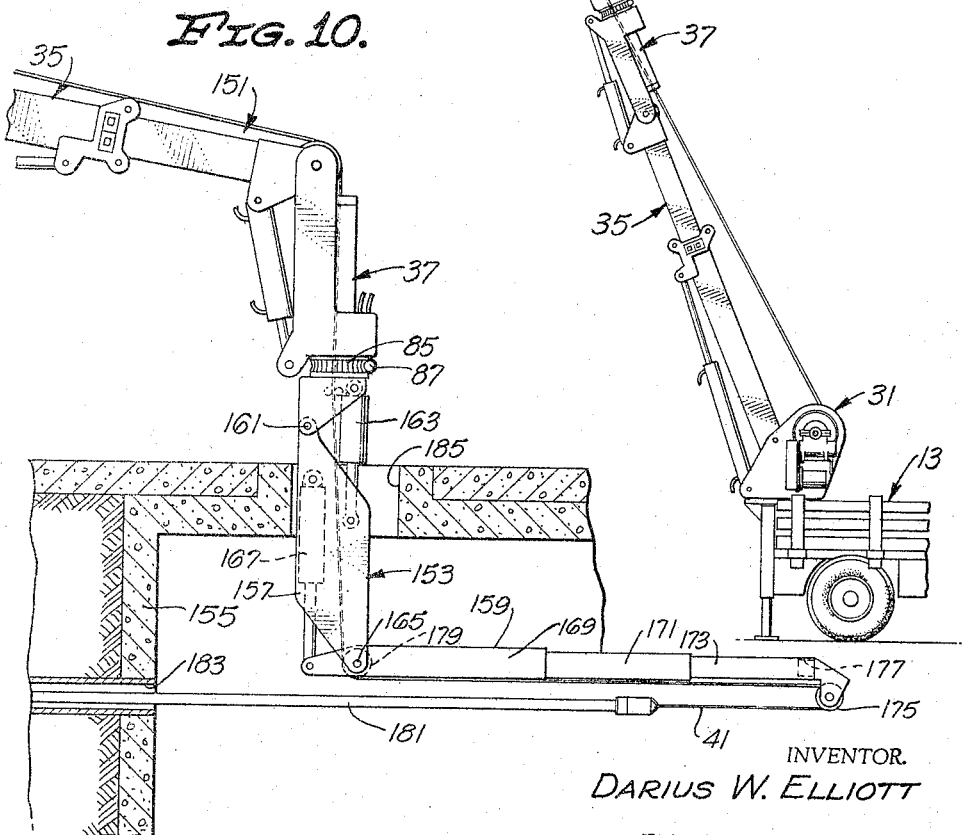

United States Patent Office

3,244,292
Patented Apr. 5, 1966

3,244,292
UNIVERSAL CABLE, WIRE, AND LOAD-
HANDLING DEVICE
Darius W. Elliott, Anaheim, Calif., assignor to Calavar
Corporation, Santa Fe Springs, Calif., a corporation of
California
Filed Feb. 9, 1965, Ser. No. 431,289
20 Claims. (Cl. 212—59)

The present invention relates generally to the load or article handling art and more particularly to a novel universal cable, wire, and loading-handling device which is especially advantageous for use in the electrical public utility field and related fields where workmen install and service underground cables, underground and overhead transformers and switch gear, electrical transmission lines, and the like.

As is well known to those who are engaged in the aforementioned fields, both the safety of the workmen and the cost of the installation are important factors which must be considered on each job involving the installation or servicing of such electrical equipment.

Insofar as expense is concerned, it is advantageous to have as few workmen as possible on a particular job and to be able to complete the job as quickly as possible. Also, as to the safety factor, it is obviously desirable to avoid accidents because of the likelihood of injury to workmen and also because accidents involving either men or equipment are costly and cause lengthy delays.

Accordingly, it is desirable to have a mechanical device for use in the aforementioned fields, which device will reduce the number of men on the job and the time required to complete the job, and also reduce the likelihood of injury to men and equipment.

However, one of the main problems in providing a mechanical device for use in the installation and servicing of electrical equipment is that the type of work is so very diverse there is no known equipment which will function satisfactorily for more than one particular type of installation, and even with a single type of installation the present equipment is not completely satisfactory.

Thus, it is advantageous to have mechanical equipment to aid in installing underground cables in conduits which extend between underground vaults, both in situations where the cable terminates at the vault and also in situations where it is necessary to pull enough cable into the vault to provide a "riser" which can be connected to a transformer on a pole adjacent the vault. In the last-mentioned situation, additional problems obviously arise where the cable is of a relatively large diameter or where it has a relatively rigid sheath or insulation which makes difficult the bending of the cable. The known equipment for installing or "pulling" new cable into underground conduits is not wholly satisfactory because it usually requires the workmen to enter the underground vault in order to rig the equipment, and in many instances the workmen must remain in the vault during the cable-pulling operation, thereby greatly increasing the chances of injury to the workmen if the electrical cable or the pulling cable were to snap, or the equipment in the vault were to break.

At other times in working in the aforementioned fields it would be advantageous to have a mechanical device for removing or stripping old cable from underground conduits and salvaging it for future use in other localities, as where it is necessary to install new cable having a greater load-carrying capacity. The known equipment for and method of pulling out old cable are not satisfactory because the cable is usually damaged during the removal thereof so as to make it unsuitable for other installations, and it is usually pulled out in short lengths and cut off rather than to endeavor to wind it onto a reel for future use.

Accordingly, one object of the present invention is to provide a novel universal cable, wire, and load-handling device which is mounted on a mobile carrier or vehicle and which includes a boom which can be inserted from above ground into an underground vault through a manhole no more than two feet in diameter, for pulling new cable through underground conduits and into the vault in which the boom is inserted. More particularly, it is an object to provide such a device which can be operated from a remote position so that no workmen are required to be in the underground vault during the movement of the boom into the vault or during the pulling operation.

Another object is to provide such a device which can also be used for stripping or removing old cable from underground conduits and for simultaneously winding it onto reels for future use in a different locality. More particularly, it is an object to provide such a device which includes means for removing old cable from underground conduits and winding it onto storage reels without cutting it into short lengths and without damaging the lead sheath and/or paper insulation.

In the aforementioned electrical public utility field, it is also often necessary to lower transformers and switch gear into such underground vaults through openings which are not much larger than the manhole openings, and to ofttimes mount such equipment on or adjacent a wall of the vault which may be fifteen or twenty feet distant from the manhole or opening through which the equipment is inserted.

Accordingly, it is another object of the present invention to provide such a universal cable, wire, and load-handling device which is mounted on a mobile carrier and which can be used for installing or pulling new cables in underground conduits, and which can also be used for lifting a transformer or the like from a truck, moving it over to the manhole or other opening in the underground vault, lowering it into the vault, and also moving it within the vault to adjacent the location where it is to be installed. Here again, it is a further object to provide such a device which can be operated from above ground and outside the vault so that workmen are not required in the vault during the time the piece of equipment is being lowered into the vault and moved into position.

At other times during the installation and servicing of electrical equipment it is advantageous to have a device which can raise crossarms, insulators, and the like as high as twenty or thirty feet into the air, and which can also be used for stringing overhead wires between poles or towers.

Accordingly, it is yet another object of the present invention to provide such a universal cable, wire, and load-handling device which is mounted on a mobile carrier or vehicle and which can also be used in a manner similar to a crane with a long boom for lifting objects to the tops of poles and towers and also for stringing overhead wires between such poles and towers.

A further object is to provide such a universal cable, wire, and load-handling device which is mounted on a mobile carrier or vehicle such as a four-wheel truck and which can be easily and quickly moved between an inoperative or traveling position in which the device is collapsed and stored within the confines of the truck without extending beyond a reasonable distance above the cab of the truck and into one or more operative positions in which it can be used for pulling wire in underground conduits, for stripping or removing cable from underground conduits, for lowering equipment into underground vaults, for raising equipment to the tops of poles and towers, or for installing overhead electrical conductors between poles and towers.

Yet another object is to provide such a novel universal cable, wire, and load-handling device which can be actuated from a remote control console which can be positioned above ground, or which, if the occasion demands, can be positioned within the underground vault into which the cable is being pulled or into which a transformer or the like is being lowered.

One embodiment of a device constructed in accordance with the teachings of the present invention and capable of accomplishing all of the aforementioned objects and advantages comprises an articulated boom adapted to have the base end thereof pivotally and rotatably mounted on a vehicle, and including arm means at said base end which contains an outer member and an inner member which is axially movable relative to said outer member in telescoping relationship therewith. An intermediate link is pivotally connected to the outer end of the inner member, and, in turn, an end link is pivotally and rotatably mounted on the outer end of the intermediate link. The end link contains a pivotally mounted, curved, gooseneck portion at the free end thereof, which gooseneck portion contains a plurality of spaced-apart rollers in an arcuate configuration for supporting and guiding a cable onto and off the end of the boom.

A cable winch is supported on the device adjacent the base end thereof for controlling the movement of the cable which extends the length of the boom and over the rollers in the gooseneck portion.

Said gooseneck portion is adapted to be secured in a closed position, as where the end link is positioned in an underground vault and the device is used to pull cables through underground conduits, or is adapted to be secured in an open or extended position in which it is substantially coaxial with the end link and a boom extension is mounted on the end link adjacent to said gooseneck portion, as when the device is used as a crane.

The present invention, both as to its construction and method of operation, together with further objects and advantages thereof, may best be understood by reference to the following description taken in connection with the accompanying drawings.

In the drawings:

FIG. 1 is a side elevational view of a universal cable, wire, and load-handling device constructed in accordance with the teachings of the present invention, shown mounted on a mobile carrier or vehicle in the inoperative or traveling position;

FIG. 2 is a side elevational view of the device in an operative position in an underground vault for pulling new cable through a conduit and into the vault, with the control console positioned above ground adjacent the manhole which opens into the vault;

FIG. 3 is an enlarged, horizontal, sectional view taken on the line 3—3 in FIG. 2;

FIG. 4 is an enlarged, horizontal sectional view taken on the line 4—4 in FIG. 2;

FIG. 5 is an enlarged, vertical sectional view of a portion of the boom immediately below the line 3—3 in FIG. 2 and taken on line 5—5 in FIG. 3;

FIG. 6 is a fragmentary elevational view (partially in section) of the free end of the boom portion of the device, illustrating the position of the parts thereof when the device is used in lowering a transformer or the like into an underground vault;

FIG. 7 is a reduced, side elevational view of the device in the operative position functioning as a crane with the boom extension fastened to the free end of the boom proper to increase the effective length of the boom;

FIG. 8 is an enlarged, fragmentary, side elevational view of a portion of the boom shown in FIG. 7, illustrating the construction at the free end of the main boom and the manner in which the boom extension coacts therewith;

FIG. 9 is a side elevational view similar to FIG. 2, illustrating a modified construction of the device with the boom positioned in an underground vault pulling old cable from a conduit and winding it onto a storage reel;

FIG. 10 is a fragmentary, side elevational view of the free end of the boom portion of the device positioned in an underground vault, illustrating a further modified construction of the boom for pulling large diameter, relatively rigid cable into the vault; and FIG. 11 is a reduced, side elevational view similar to FIG. 7, showing the modified construction illustrated in FIG. 10 but with the boom in the vertically extending position for use as a crane and with a boom extension mounted thereon to increase the effective length of the boom.

Referring to the drawings more particularly by reference numerals, and specifically to FIG. 2, 10 indicates a universal cable, wire, and load-handling device embodying the teachings of the present invention, shown mounted on a mobile carrier or truck 13 and operable in response to signals from a portable control console 15.

The truck 13 is of conventional construction and includes a generally flat truck bed 17, adjustable outriggers or braces 18, a vertically extending journal 19 at the rear end thereof, two reverse acting fluid-operated piston cylinder actuators 21, and a chain 23 secured to each of the pistons of the piston-cylinder actuators and driving a sprocket 25. The reverse acting piston cylinder actuators 21 pull the chain 23 thereby rotating the sprocket 25 which is disposed in a generally horizontal plane near the bottom of the journal 19.

Each of the piston-cylinder actuators includes a piston slidably mounted in a cylinder and connected to a connecting rod, movement of the piston and connecting rod being caused by controlling the flow of fluid to and from the cylinder in a conventional manner.

The device 10 includes a multi-section articulated boom 11 which contains arm means 27 and an end link 29. The arm means 27 includes a winch section 31 having a shaft 33 received in the journal 19 and driven in rotation by the sprocket 25, an elongated first link 35, and an end portion or intermediate link 37. Rotation of the sprocket 25 acting through the shaft 33 causes rotation of the entire boom 11 about a vertical axis. The winch section 31 also includes a motor-driven winch 39 for winding up and reeling out cable means 41, the winch preferably being of a type which will move the cable means at a constant speed and apply constant tension thereto. The winch 39 is supported for rotation about a shaft 43 which is secured to two spaced parallel plates 45 (only one being shown) by bearings 47 on each of the spaced parallel plates.

The first link 35 includes a tubular portion 49, the inner end of which is pivotally secured by a pin 51 on the winch section 31 for pivotal movement about a horizontal pivotal axis, and an extendible portion 53 telescopically received in the tubular portion. A fluid pressure responsive piston cylinder actuator 55 is secured to the tubular portion 49 and to the extendible portion 53 for extending and retracting the extendible portion. Another fluid pressure responsive piston cylinder actuator 57 is pivotally connected at one end to the winch section 31 and at the other end to a bearing housing 59 mounted on the outer end of the tubular portion 49. Thus, by extending the piston-cylinder actuators 55 and 57, the boom 11 is extended and pivoted in the counterclockwise direction about the pin 51. The bearing housing 59 contains bearings 61 to facilitate the telescopic movement of the extendible portion 53.

The intermediate link 37 which serves to interconnect the links 35 and 29 is pivotally secured by a pin 63 at its inner end to the outer end of the first elongated link 35 for pivotal movement about a generally horizontal pivotal axis, the intermediate link having a longitudinal axis which is generally transverse to such horizontal pivotal axis. A roller 64 for the cable 41 is rotatably mounted on the pin 63. As shown in FIG. 3, the intermediate link 37 includes a cylindrical section or journal 65 having two spaced parallel plates 67 welded to the outer surface thereof. The intermediate link 37 may be pivoted about the pin 63 by a piston cylinder actuator 69 which is connected at one end to the extendible portion 53 and at the other end to the spaced parallel plates 67.

The elongated end link 29 includes an elongated portion 71 and a curved gooseneck portion 73 pivotally secured to the elongated portion by a pin 75 and curving away from the longitudinal axis of the elongated portion, the inner end of the elongated portion having a joint 77 forming a horizontal pivotal axis. As seen in FIG. 5, the inner or upper end of the end link 29 forms a hollow cylindrical shaft 79 which is rotatably received by the journal 65 of the intermediate link 37 and is retained for rotation therein by a bearing 81. The rotational axis of the end link 29 extends generally in the direction of the longitudinal axis of the intermediate link 37 and is coaxial with the axis of the journal 65.

Means for rotating the elongated end link 29 about its rotational axis include a reversible motor 83 (FIG. 5) driving a ring gear 85 which is pinned to the hollow cylindrical shaft 79 through a worm gear 87. A guard 89 is provided around the ring gear to protect it.

The end link 29 is pivoted about the joint 77 by a typical fluid operated piston-cylinder actuator 91 which is secured to the end link at opposite sides of the joint. As shown in FIG. 4, the elongated end link 29 is preferably hollow and generally rectangular in cross section with one side forming a longitudinal opening 93.

The gooseneck portion 73 is constructed of two substantially flat spaced parallel plates which curve through an arc of approximately 90°, and is releasably pinned by a pin 95 to the elongated portion 71 to normally prevent pivotal movement about the pin 75. The cable 41 which passes from the winch 39 through the hollow cylindrical shaft 79 (FIG. 5) and through the hollow of the elongated portion 71 is forced during the wire pulling operation against a plurality of arcuately arranged rollers 97 mounted between the spaced plates of the gooseneck portion 73.

As shown in FIG. 2, underground conduits 99 and 101 terminate in an underground vault 103, access to which may be had from above ground through a relatively narrow manhole 105. The end link 29 has been inserted through the narrow manhole 105 into the vault 103 and means are provided on the end link for anchoring it to the vault. Such means include a tubular receiving means or receiver 107 secured about a transverse pivotal axis to the gooseneck portion 73 adjacent the inner end thereof, a shaft 109 telescopically received by the receiving means, and a piston cylinder actuator 111 pivotally secured at one end to the end link 29 and at the other end to the tubular receiver 107. The receiver 107 and the shaft 109 have a plurality of apertures 113 and 115, respectively, through which a pin (not shown) may be inserted to adjust the length of the shaft extending beyond the receiver. A spring 116 biases the receiver toward the remote end of the gooseneck portion 73.

When the device is used for wire pulling, as shown in FIG. 2, the cable 41 is secured to a leader or to the wire which is to be pulled, and the winch is operated to move the cable along the end link 29 and the arm means 27 to pull the wire through the conduit 99. The force required to pull the wire will cause the end of the shaft 109 to abut a wall of the vault 103 to thereby relieve some of the force that would be applied to other portions of the boom 11 and vehicle 13 if the shaft 109 were not used. The arcuately arranged rollers 97 form a gentle curve for the wire so that it will not have to traverse a sharp bend as it is pulled out of the conduit and up through the manhole 105.

An important feature of this invention is that the end link 29 is rotatable about a rotational axis extending generally in the direction of the longitudinal axis of the intermediate link 37. Thus, when the end link 29 is in the vault, it may be rotated to precisely align the remote end of the gooseneck portion 73 with the conduit 99. This eliminates the need for precisely positioning the vehicle 13. Furthermore wire may also be pulled through the conduit 101 by merely rotating the end link 29 through 180°. Accordingly, wire may be pulled through several conduits terminating in a single vault without moving the vehicle 13 on which the boom 11 is mounted.

Another important feature of this invention is that the gooseneck portion 73 may be inserted through relatively narrow apertures such as the manhole 105. By removing the removable pin 95 and extending the piston-cylinder actuator 111, the gooseneck portion 73 is caused to pivot about the pin 75 to minimize a transverse dimension presented to the narrow manhole 105. That is, by pivoting the gooseneck portion 73 in the counterclockwise direction as shown in FIG. 2, a minimum dimension will be presented to the manhole 105 thereby allowing the end of the boom 11 to pass through narrow apertures into relatively inaccessible areas.

Another significant feature of this invention is the portable control console 15 from which all pivotal and rotational movements of the articulated boom 11 can be controlled. The portable control console 15 is connected to the various piston-cylinder actuators by a long multiconductor cable 117 which will allow movement of the control console close to the area in which work is being performed; e.g., the manhole 105. The controls which are actuated by the portable control console are conventional and are not described in detail herein.

FIG. 6 indicates how the device of FIGS. 1–5 may be used for moving loads. The cable 41 extends vertically downwardly between the spaced plates of the gooseneck portion 73 from one of the rollers 97 and a load (not shown) may be attached to the cable 41 and the desired motion may be imparted to it by appropriate actuation of the various actuators for causing pivotal and rotational movement of the boom 11 and also by controlling the winch 39.

FIGS. 7 and 8 show the same device previously described but with the parts thereof in a slightly different relationship and with several auxiliary members added whereby it can be used as a crane in the installation and repair of overhead electrical power lines.

Thus when the device 10 is to be used as a crane the pin 95 is removed (FIG. 8) the actuator 111 is extended to pivot the gooseneck portion 73 into substantial axial alignment with the elongated portion 71, and a short rigid link 121 is used to interconnect the elongated portion 71 with the gooseneck portion 73 so as to maintain the latter in the extended position.

The shaft 109 is then removed from the tubular receiver 107 and replaced with an elongated boom extension 123 which is preferably made from a strong, lightweight material such as fibreglass. A sheave or pulley 125 is mounted on the free end of the boom extension 123.

Thus it will be readily apparent that the free end of the boom which contains the sheave or pulley 125 can be moved in the vertical direction with a great degree of control by actuating one or more of the actuators 111, 91, 69, and 57. In addition, the end of the boom can be rotated by means of the ring gear 85 and the worm gear 87 previously described. Furthermore, the entire articulated boom can be rotated by rotating the winch section 31.

Some cranes and similar devices which contain booms are transported by a vehicle from which the boom extends horizontally a significant amount. Booms which must be transported in such extended condition are a safety hazard to other motorists and also may adversely affect the positioning of the center of gravity of the vehicle-boom combination. FIG. 1 illustrates the safe and efficient manner in which the boom of the present device may be positioned for traveling between jobs.

As shown in FIG. 1, the winch section 31 is rotated so that the elongated first link 35 which is in its shortest position is spaced vertically upwardly from the truck bed 17 and extends slightly upwardly and forwardly therealong. The intermediate link 37 extends generally vertically downward from the outer end of the first link 35 toward the forward end portion of the truck bed 17. The end of the intermediate link 37 may rest upon such forward end portion of the truck bed 17. The elongated end link 29 extends from the outer end of the intermediate link 37 rearwardly and upwardly along the truck bed and terminates adjacent the rear end thereof. The end link 29 is rotated so that the gooseneck portion 73 extends generally vertically upward from the elongated portion 71. Other components of the device such as the portable control console 15 and the boom extension 123 may be suitably secured on the truck bed 17.

A plurality of flexible hydraulic conduits 127 (FIG. 1) lead from a source of fluid under pressure (not shown) to each of the piston-cylinder actuators previously described. To avoid entangling these flexible conduits and to provide for the longitudinal movement of the extendible portion 53 relative to the tubular portion 49, they are disposed within a rigid sheath 129 which has one end thereof secured to the extendible portion 53 by a clamp 133 and the other end slidably mounted in a case or housing 131 mounted on the exterior of the tubular portion 49, with additional portions of the conduits 127 folded within the housing. Thus, with the first link 35 in its retracted or shortest position, the sheath 129 is contained within the housing 131 as shown in FIG. 1. When the first link 35 is extended, the sheath 129 slides from the housing 131 and the conduits unfold to extended positions.

FIG. 9 shows the manner in which the device previously described can be modified slightly to add a take-up reel or drum, as where the device is to be used to remove existing cable from underground conducts and store it for use in other locations.

At the present time old cable is pulled from the conduits in any convenient manner and without regard to the insulation or lead sheath, with the usual result that the cable is so badly damaged that it cannot be reused. For example, one method of removing cable is to back up a truck to the manhole, attach a tow chain to the cable, drive the truck down the street and thereby pull a length of cable from the conduit, cut off the extracted portion of the cable, and repeat the process until all of the cable has been removed.

In the embodiment shown in FIG. 9, parts which are similar to the parts contained in the embodiment shown in FIGS. 1–8 are designated by the same reference numerals.

Thus in FIG. 9 a similar articulated boom 135 includes the same winch section 31, the first elongated link 35, the intermediate link 37, and the end link 29. The device of FIG. 9 differs from the device 10 previously described in that it includes a support bracket 137, a large diameter reel 139 rotatably mounted on the support bracket, and a drive belt 141 for rotating the reel from a drive pulley 142 mounted outboard of the winch 39. The reel 139 and the boom 135 are mounted on the vehicle 13 so that the reel is freely rotatable above the truck bed 17.

The first link 35 and the intermediate link 37 will normally intersect to form an acute angle when wire is being pulled from the conduit 99 which terminates in the underground vault 103. To prevent sharp changes in direction of the wire as it is drawn along the boom a slide 143 having a gently curved surface is provided adjacent the point of intersection of the first link 35 and the intermediate link 37. The slide 143 may be tubular or may have a generally channel-shaped cross section to laterally retain a large diameter cable or wire 145 and the curved surface provided by the slide has a relatively large diameter. To allow pivoting of the intermediate link 37 about the pin 63, the slide 143 is pivotally attached by a pin 147 to a bracket 149 adjacent the outer end of the extendible portion 53. Thus, the slide 143 does not prevent rotation of the intermediate link 37 about the pin 63 in the counterclockwise direction.

In the operation of this embodiment, the power operated winch 39 drives the reel 139 through the belt 141 to pull the large diameter wire 145 through the conduit 99 and wind it on the reel. The rollers 97 in the gooseneck portion 73 prevent sharp bending of the wire 145 as its direction of movement changes from horizontal to vertical. The slide 143 with its gently curved surface and the large diameter reel 139 prevent sharp bending of the wire 145 as the wire is subsequently caused to change its direction of movement.

FIGS. 10 and 11 show a further modified embodiment of the present invention in which the construction of the end link 29 (FIG. 2) is changed to provide a device which can pull the cable a greater distance into the vault, and which can also be used for maneuvering equipment around in the vault.

As mentioned hereinabove, in some installations the cable which is being pulled in the conduit has a relatively large diameter or a relatively rigid sheath, whereby it cannot be pulled around an arc of short radius as contained in the gooseneck portion 73 shown in FIG. 2. However, a device which can pull on a straight line into the vault should also be able to function as a crane for use with overhead power lines. The device shown in FIGS. 10 and 11 fulfill both of these objectives.

Referring to FIG. 10, the articulated boom 151 is similar to the boom 11 previously described, through the intermediate link 37 and the ring gear 85. An elongated end link 153 which is shown partially within a vault 155 includes an inner section 157 rotatably secured within the intermediate link 37 for rotation about a rotational axis extending generally in the same direction as the longitudinal axis of the intermediate link and an outer section 159. The end link 153 is received in the intermediate link 37 and is rotatable through the gears 85 and 87 in the same manner as the end link 29 previously described. The inner section 157 includes a pin 161 forming a horizontal pivotal axis about which the inner section is pivoted by a piston-cylinder actuator 163.

The outer section 159 is pivoted to the inner section 157 by a pin 165 for pivotal movement about a horizontal axis and a piston-cylinder actuator 167 is operable to pivot the outer section about that horizontal axis. The outer section 159 includes three telescopic portions 169, 171, and 173, the telescopic section 173 mounting a pulley 175 at the outer end thereof and also having a recess 177. The length of the outer section 159 may be varied by adjusting the exposed lengths of the telescopic sections 169, 171, and 173 in any conventional manner. The cable means 41 rolls over a pulley 179 and the pulley 175 and is connected to a conductor 181 which is being pulled through a conduit 183.

In utilizing the device of FIG. 10 to pull the conductor 181 through the conduit 183, the outer section 159 may be pivoted as shown in order to pull the wire to the extreme right-hand end of the vault 155 so that it may be attached to electrical apparatus which may be remote from the conduit 183. This embodiment is also particularly advantageous in lowering heavy objects such as transformers into the vault 155 and then positioning them therein. For example, a transformer or other object may be secured to the cable 41 when the outer section 159 is aligned with the inner section 157 and such transformer lowered through a manhole 185 into the vault 155. By rotating the end link 153 relative to the intermediate link 37, pivoting the end section 159 about the pin 165, and by varying the length of the outer section 159, the transformer may be accurately positioned within the vault.

It is apparent that the boom 151 of FIG. 10 may be used for overhead work employing the same construction shown therein. However, if it is desired to work at a greater height a boom extension 187 (FIG. 11) constructed of strong, lightweight insulating material, such as fiberglass, and having a pulley 189 at the outer end thereof is secured in the recess 177 of the telescopic section 173 by a collar or tubular receiving means 191. Such a construction may be used for overhead work in a manner similar to the embodiment shown in FIGS. 7 and 8. The boom of FIGS. 10 and 11 are collapsible substantially as shown in FIG. 1.

It is apparent, therefore, that the articulated boom assembly of the present invention is extremely versatile and is capable of working below the surface of the ground and at relatively high overhead heights. The versatility of the device for work in an underground vault is enhanced by the rotational capabilities of the end link and is further improved by the construction of FIG. 10 which allows pivoting of the outer section of the end link about a horizontal axis within the vault. The device also performs efficiently at various overhead heights and is capable of reaching relatively inaccessible areas because of the numerous pivotal and rotational movements of which it is capable.

Many changes, modifications, and substitutions may be made by those having only ordinary skill in the art without departing from the spirit and scope of this invention.

I claim:

1. An articulated boom device for exerting a force on a load and adapted to be mounted on a vehicle, comprising:
    arm means having inner and outer ends and being connectible to the vehicle adjacent the inner end thereof;
    an elongated end link secured adjacent the inner end thereof to said outer end of said arm means, said end link having a longitudinal axis;
    means for pivoting at least a portion of said end link about a generally horizontal pivotal axis to a position in which the longitudinal axis thereof is generally vertical;
    means for rotating said end link relative to said arm means about a generally vertical rotational axis when said longitudinal axis of said end link is generally vertical;
    cable means supported by said end link and said arm means for transmitting the force to the load; and
    means for moving said cable means along said arm means and said end link to exert the force on the load.

2. An articulated boom device for exerting a force on a load and adapted to be mounted on a vehicle, comprising:
    an elongated first link means connectible to the vehicle adjacent the inner end thereof;
    an end link having an inner end;
    interconnecting means having a central axis and securing said end link to said first link means for rotation relative thereto about a rotational axis extending generally in the direction of said central axis of said interconnecting means;
    means for pivoting at least a portion of said end link about a generally horizontal pivotal axis which extends generally transversely of said end link, said rotational axis extending generally transversely of said pivotal axis;
    means for rotating said end link about said rotational axis;
    cable means supported by said end link and said link means for transmitting the force to the load; and
    means for moving said cable means along said link means and said end link to exert the force on the load.

3. An articulated boom device as defined in claim 2 wherein said interconnecting means forms a journal for receiving said inner end of said end link and said central axis of said interconnecting means and said rotational axis are substantially coaxial.

4. An articulated boom device as defined in claim 2 wherein said pivotal axis lies between said interconecting means and the outer end of said end link.

5. An articulated boom device as defined in claim 2 wherein said end link is elongated and has a longitudinal axis, and an outer end portion of said end link curves away from the longitudinal axis of said end link.

6. An articulated boom device as defined in claim 2 further comprising portable remote control console means for controlling the pivotal and rotational movement of said end link.

7. An articulated boom device attachable to a vehicle and insertable through a narrow aperture into a vault for pulling wire through a conduit therein comprising:
    arm means connectible to the vehicle adjacent one end and having an end portion at the other end thereof, said end portion having a longitudinal axis;
    an elongated end link pivotally secured at the inner end thereof to said end portion of said arm means, said end link including an elongated portion and a curved gooseneck portion secured to said elongated portion and curving away from the longitudinal axis thereof;
    means for pivoting said curved gooseneck portion relative to said elongated portion about a pivotal axis transverse to the longitudinal axis of said elongated portion, the pivoting of said elongated portion varying and minimizing a transverse dimension presented to the narrow aperture to allow insertion of said gooseneck portion therethrough;
    cable means supported by and along said arm means and said end link for transmitting a pulling force to the wire, said goosenck portion directing said cable means toward the wire; and
    means for moving said cable means along said arm means and said end link to pull the wire through the conduit.

8. In an articulated boom device adapted for mounting on a vehicle, the combination of:
    a first link having inner and outer ends and a longitudinal axis, said first link being connectible adjacent the inner end thereof to the vehicle;
    an intermediate link pivotally secured adjacent the inner end thereof to said first link adjacent the outer end thereof for pivotal movement about a pivotal axis which is generally horizontal and transverse to said longitudinal axis of said first link, said intermediate link having a longitudinal axis which is generally transverse to said pivotal axis;
    an end member secured adjacent the inner end thereof to said intermediate link;
    means for rotating said end member relative to said intermediate link about a rotational axis extending generally in the direction of the longitudinal axis of said intermediate link;
    flexible load-supporting means uspported by said end member and said links; and
    means for moving said flexible load-supporting means along said end member and said links.

9. An articulated boom device attachable to a vehicle and operable above and below the surface of the ground to exert a force on a load comprising:
    arm means connectible to the vehicle adjacent one end and having an end portion at the other end thereof, said end portion having a longitudinal axis;
    an elongated end link secured at the inner end thereof to said end portion of said arm means, said end link including an elongated portion and a curved gooseneck portion pivotally secured to said elongated portion and curving away from the longitudinal axis thereof;
    an elongated boom extension;
    receiving means secured about a transverse pivotal axis to said goosenck portion adjacent the inner end thereof for releasably receiving said boom extension;

means for pivoting said receiving means about said transverse pivotal axis to thereby adjust the angular position of said boom extension;
removable means for preventing relative movement between said gooseneck portion and said elongated portion;
cable means supported by said arm means, said end link, and said boom extension for transmitting the force to the load; and
means for moving said cable means along said arm means, said end link, and said boom extension to exert the force on the load.

10. An articulated boom device for exerting a force on a load and connectible to a vehicle comprising:
an elongated first link connectible adjacent the inner end thereof to the vehicle;
an intermediate link pivotally secured adjacent the inner end thereof to the outer end of said first link for pivotal movement about a generally horizontal pivotal axis, said intermediate link having a longitudinal axis generally transverse of said horizontal pivotal axis;
an elongated end link secured adjacent the inner end thereof to the outer end of said intermediate link;
means for rotating said elongated end link relative to said intermediate link about a rotational axis extending generally in the direction of said longitudinal axis of said intermediate link;
means for pivoting said end link about a pivotal axis intermediate the ends thereof and extending generally transversely of said rotational axis;
cable means supported by said first link, said intermediate link, and said end link for transmitting the force to the load; and
means for moving said cable means along said end link, said intermediate link, and said first link to exert the force on the load.

11. An articulated boom device as defined in claim 10 wherein said first link is extendible in the direction of its elongation and means are provided for extending said first link, said intermediate link defining a journal for receiving said inner end of said end link, said rotating means includes a motor and a gear train drivingly interconnecting said motor and said end link, at least a portion of said end link is tubular, an outer end portion of said end link curves away from the longitudinal axis of said elongated end link, and said cable means extends through the tubular portion of said end link.

12. In combination:
a support;
arm means having inner and outer ends with a major longitudinal axis which extends through the inner end, said inner end being secured to said support;
an elongated end link including an inner end which is secured to said outer end of the arm means;
means for pivoting at least a portion of the end link about a pivotal axis passing therethrough which is generally transverse to said major longitudinal axis of the arm means;
means for rotating the end link relative to said arm means about a rotational axis which extends longitudinally through at least a portion of said end link and generally transversely to said pivotal axis;
flexible load-supporting means supported by said end link and said arm means; and
means for moving said load-supporting means along said end link and said arm means.

13. A universal wire pulling and load-handling device for exerting a force on a load comprising:
a vehicle;
an elongated first link pivotally connected adjacent the inner end thereof to said vehicle;
an intermediate link pivotally secured adjacent the inner end thereof to the outer end of said first link for pivotal movement about a generally horizontal pivotal axis, said intermediate link having a longitudinal axis generally transverse of said horizontal pivotal axis;
an elongated end link secured adjacent the inner end thereof to the outer end of said intermediate link;
means for rotating said elongated end link relative to said intermediate link about a rotational axis extending generally in the direction of said longitudinal axis of said intermediate link;
means for pivoting said end link about a pivotal axis intermediate the ends thereof and transverse of said rotational axis;
cable means supported by said first link, said intermediate link, and said end link for transmitting the force to the load; and
means for moving said cable means along said end link, said intermediate link, and said first link to exert the force on the load.

14. A universal wire pulling and load-handling device comprising:
a truck having a truck bed forming the rear portion thereof;
an elongated first link secured to the rear of said truck bed for pivotal movement about a generally horizontal axis and a generally vertical axis, said elongated first link being spaced vertically upwardly from said truck bed and extending forwardly therealong;
an intermediate link pivotally secured adjacent the inner end thereof to the outer end of said first link for pivotal movement about a generally horizontal pivotal axis, said intermediate link extending generally vertically downward toward the forward end portion of said truck bed and having a longitudinal axis;
an elongated end link secured adjacent the inner end thereof to the outer end of said intermediate link, said end link extending rearwardly along said truck bed and terminating adjacent the rear of said truck bed; and
means for rotating said end link about an axis extending generally in the direction of said longitudinal axis of said intermediate link.

15. An articulated boom device connectible to a vehicle for pulling wire through an underground conduit, winding it on a reel and gradually changing the direction of movement of the wire between the conduit and the reel comprising:
arm means connectible to the vehicle adjacent one end and having an end portion at the other end thereof, said end portion having a longitudinal axis;
an elongated end link having the inner end thereof secured to said end portion of said arm means for rotation about a rotational axis extending generally in the direction of said longitudinal axis;
means for pivoting said end link about a pivotal axis extending generally transverse of said rotational axis and of said end link;
cable means supported by said end link and said arm means for transmitting a force to the wire to pull the wire through the conduit and along said end link and said arm means;
means for moving said cable means and the wire along said arm means and said end link; and
means for preventing sharp bending of the wire as it moves along said links and said arm means.

16. An articulated boom device connectible to a vehicle for pulling wire through an underground conduit comprising:
an elongated first link connectible adjacent the inner end thereof to the vehicle;
an intermediate link pivotally secured adjacent the inner end thereof to the outer end of said first link for pivotal movement about a generally horizontal pivotal axis, said intermediate link normally being pivoted about said horizontal pivotal axis to form a relatively sharp angle with said first link when the wire is being pulled through the underground conduit;

an elongated end link secured adjacent the inner end thereof to the outer end of said intermediate link;

cable means supported by said first link, said intermediate link, and said end link for transmitting a force to the wire to pull the wire through the conduit and along said links to the vehicle;

means for moving said cable means and the wire along said links; and means for providing a gently curved surface adjacent said relatively sharp angle to support the wire and to prevent it from being sharply bent as it is pulled along said links.

17. An articulated boom device connectible to a vehicle for lowering a heavy object into an underground vault and positioning it therein comprising:

arm means connectible to the vehicle adjacent one end having an end portion at the other end thereof, said end portion having a longitudinal axis;

an elongated end link having an inner section and an outer section pivotally secured together about a pivotal axis generally transverse of the direction of elongation of said end link, said inner section being secured to said end portion of said arm means and said outer section being positionable within the vault;

means for rotating said end link relative to said arm means about a roational axis extending generally in the direction of said longitudinal axis of said end portion;

means for pivoting said outer section of said end link about said transverse pivotal axis; and cable means supported by said links and said arm means for supporting and lowering the heavy object into the vault whereby rotation of said end link about said rotational axis and pivoting of said outer section of said end link about said transverse pivotal axis accurately positions the heavy object within the vault.

18. An articulated boom device as defined in claim 17 wherein said outer section is of adjustable length.

19. An articulated boom device as defined in claim 17 further including means providing a pivotal axis intermediate the ends of the inner section of the end link.

20. An articulated boom device for exerting a force on a load and connectible to a vehicle comprising:

a first elongated link connectible adjacent the inner end thereof to the vehicle;

an intermediate link pivotally secured adjacent the inner end thereof to the outer end of said first link for pivotal movement about a generally horizontal pivotal axis, said pivotal axis being disposed intermediate the ends of said intermediate link;

an elongated end link secured adjacent the inner end thereof to the outer end of said intermediate link;

means for rotating said end link about a rotational axis extending generally transversely of said pivotal axis;

a boom extension;

means for releasably securing said boom extension to the outer end of said end link;

cable means supported by said boom extension and said links for transmitting the force to the load; and means for moving said cable means along said boom extension and said links to exert the force on the load.

References Cited by the Examiner

UNITED STATES PATENTS

| | | | |
|---|---|---|---|
| 1,865,113 | 6/1932 | Kiesel | 254—134.3 |
| 2,731,233 | 1/1956 | Lindsay | 254—134.3 X |
| 3,035,711 | 5/1962 | Rehnstrom | 212—35 |
| 3,154,199 | 10/1964 | Bologh et al. | 212—35 |
| 3,201,090 | 8/1965 | Jones | 254—134.3 |

FOREIGN PATENTS 978,765  12/1964  Great Britain.

EVON C. BLUNK, *Primary Examiner.*

A. LEVINE, *Assistant Examiner.*